(12) United States Patent
Schartner et al.

(10) Patent No.: US 7,100,962 B2
(45) Date of Patent: Sep. 5, 2006

(54) CONVERTIBLE ROOF BOW CONTROL MECHANISM

(75) Inventors: Todd Schartner, Flat Rock, MI (US); Scott Duley, Wyandotte, MI (US)

(73) Assignee: ASC Incorporated, Southgate, MI (US)

( * ) Notice: Subject to any disclaimer, the term of this patent is extended or adjusted under 35 U.S.C. 154(b) by 51 days.

(21) Appl. No.: 11/032,868

(22) Filed: Jan. 11, 2005

(65) Prior Publication Data

US 2006/0152033 A1   Jul. 13, 2006

(51) Int. Cl.
  *B60J 7/00* (2006.01)
(52) U.S. Cl. ............ 296/107.09; 296/117; 296/107.01
(58) Field of Classification Search ........... 296/107.09, 296/117, 107.01
  See application file for complete search history.

(56) References Cited

U.S. PATENT DOCUMENTS

| | | | |
|---|---|---|---|
| 2,895,764 A | 7/1959 | Himka et al. | |
| 3,994,524 A | 11/1976 | Lehmann | |
| 4,948,194 A | 8/1990 | Dogliani | |
| 5,042,868 A | 8/1991 | Nothaft et al. | |
| 5,067,768 A | 11/1991 | Fischbach | |
| 5,096,251 A | 3/1992 | Pfertner et al. | |
| 5,219,200 A | 6/1993 | Orth et al. | |
| 5,225,747 A | 7/1993 | Helms et al. | |
| 5,267,769 A | 12/1993 | Bonne et al. | |
| 5,385,381 A * | 1/1995 | Moore et al. | 296/117 |
| 5,620,226 A * | 4/1997 | Sautter, Jr. | 296/107.09 |
| 5,749,619 A | 5/1998 | Mentink | |
| 5,772,274 A | 6/1998 | Tokarz | |
| 5,816,644 A * | 10/1998 | Rothe et al. | 296/117 |
| 5,903,119 A * | 5/1999 | Laurain et al. | 296/107.09 |
| 5,971,470 A | 10/1999 | May et al. | |
| 6,039,382 A | 3/2000 | Mather et al. | |
| 6,048,021 A * | 4/2000 | Sautter, Jr. | 296/107.09 |
| 6,257,649 B1 | 7/2001 | Andersson et al. | |
| 6,347,827 B1 | 2/2002 | Maass | |
| 6,416,111 B1 | 7/2002 | Neubrand | |
| 6,454,342 B1 | 9/2002 | Heselhaus et al. | |
| 6,578,898 B1 * | 6/2003 | Rothe et al. | 296/107.07 |
| 6,629,719 B1 * | 10/2003 | Sims | 296/107.09 |
| 6,793,267 B1 * | 9/2004 | Hesselhaus | 296/107.08 |
| 2003/0146642 A1 * | 8/2003 | Mandl et al. | 296/107.09 |
| 2005/0189781 A1 * | 9/2005 | Powell | 296/107.01 |
| 2006/0061130 A1 * | 3/2006 | Garska | 296/107.12 |

* cited by examiner

*Primary Examiner*—Kiran B. Patel
(74) *Attorney, Agent, or Firm*—Harness, Dickey & Pierce, P.L.C.

(57) ABSTRACT

A vehicle convertible roof including a rearmost roof member, a side roof rail, an actuator and a link having a length that varies between a first length and a second as the rearmost roof member moves between a nominal and raised position. The adjustable length link is fixed at the second length during retraction and extension of the side roof rail of the vehicle convertible roof.

35 Claims, 9 Drawing Sheets

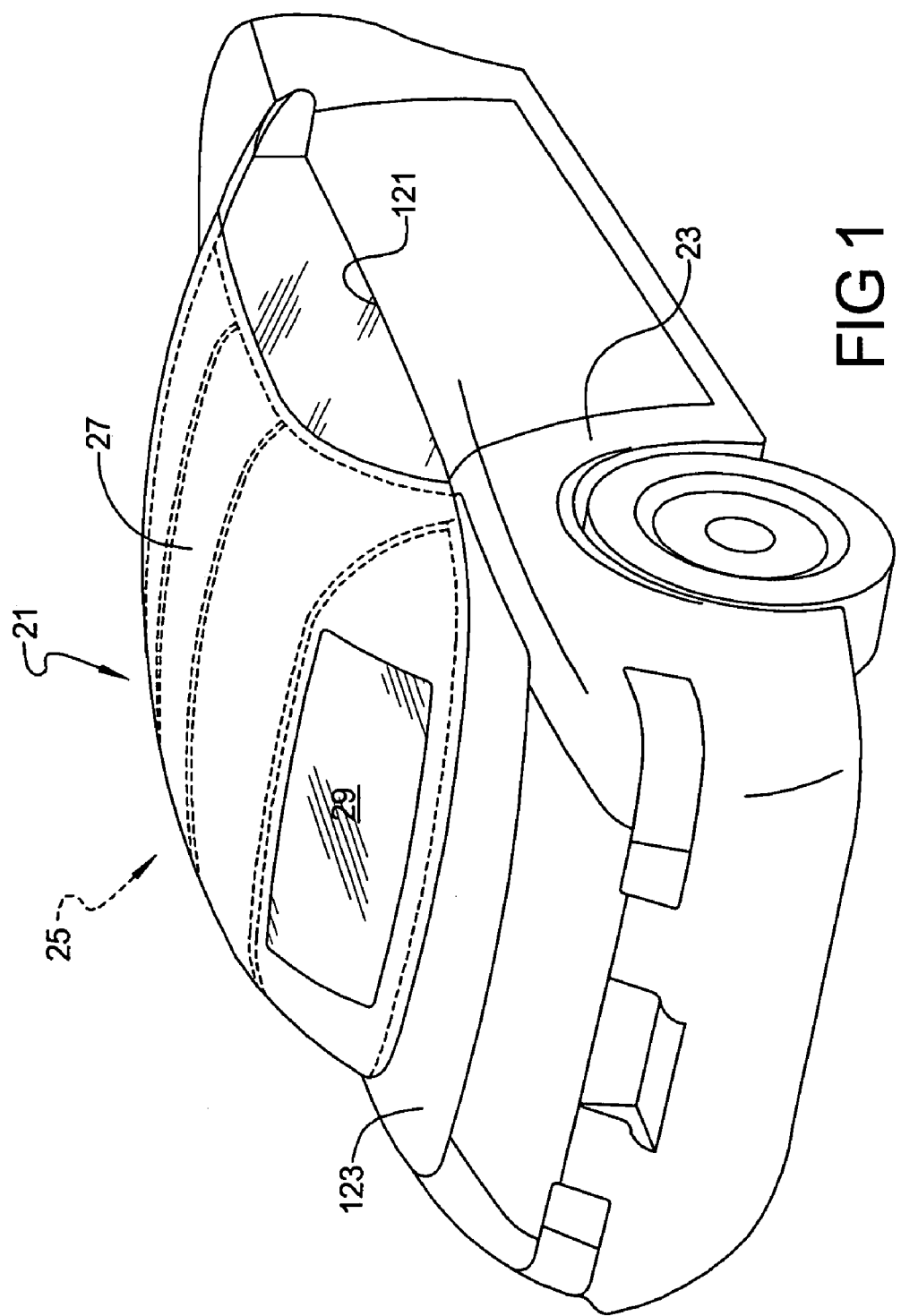

CONVERTIBLE ROOF BOW CONTROL MECHANISM

BACKGROUND AND SUMMARY OF THE INVENTION

The present invention relates generally to automotive vehicle convertible roofs and more particularly to a convertible vehicle top stack mechanism having an active rearmost roof bow.

Some traditional convertible roofs for automotive vehicles employ an active number five bow which can be selectively rotated from a nominal and generally horizontal position to a raised and generally vertical position in order to allow clearance for a moveable, rigid tonneau cover. Such a tonneau cover needs to be opened to allow convertible roof access for retraction into a storage compartment or boot well, and the tonneau cover is closed so the number five roof bow can sit on top of it when the convertible roof is fully raised. One such example is disclosed in U.S. Pat. No. 6,039,382 entitled "Folding Top for a Motor Vehicle" which issued to Mather et al., on Mar. 21, 2000, and is incorporated by reference herein. Hydraulically driven buggy links have been used to move active number five roof bows in various of these conventional roof systems. Some exemplary U.S. patents disclosing these conventional constructions are: U.S. Pat. No. 5,816,644 entitled "Folding Top for a Convertible" which issued to Rothe et al. on Oct. 6, 1998; and U.S. Pat. No. 5,749,619 entitled "Motor Vehicle with Foldable Roof, and Foldable Roof for Such a Motor Vehicle" which issued to Mentink on May 12, 1998; both of these are incorporated by reference herein. It is noteworthy, however, that many traditional number five bow actuation systems have required undesirably high forces to operate which necessitates difficult to package, large and expensive hydraulic cylinders while increasing the chance of premature part failure. Furthermore, many of these traditional systems disadvantageously create undesirably fast acceleration of the number five bow during movement which can lead to premature part failure. Moreover, many of these traditional systems also disadvantageously push the backlite or rear window into the rear passenger area of the vehicle thereby limiting the usable passenger space during the raising and retracting of the convertible roof.

In accordance with the present invention, a vehicle convertible roof includes a rearmost roof member, a side roof rail, an actuator, and a link having a length that varies as the rearmost roof member is moved between a nominal and raised position. In another aspect of the present invention, a convertible vehicle top stack mechanism includes a number five roof bow, an actuator and an adjustable length link that varies in length as the number five roof bow moves between a nominal and raised position. In still another aspect of the present invention, a method of operating a convertible roof includes changing a length of a link coupled to the rearmost roof member during movement from a nominal position to a raised position and maintaining the link at a fixed length during movement of a roof rail from a raised position to a retracted position.

The convertible vehicle top stack mechanism of the present invention is advantageous over traditional constructions in that the present invention reduces the activation forces required to move a rearmost roof bow relative to a side rail while also reducing acceleration spikes during movement of the rearmost roof bow. The present invention is further advantageous by providing movement of the convertible roof that limits the intrusion of the backlite into the passenger space during the retraction and raising operation thereby reducing the operating envelope of the convertible roof. Accordingly, the present invention reduces part failure during usage, is easier to control, and requires a smaller operating space. Additional advantages and features of the present invention will become apparent from the following description and appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view showing the preferred embodiment of an automobile vehicle convertible roof of the present invention, in a fully raised position;

DETAILED DESCRIPTION OF THE PREFERRED EMBODIMENT

Figure 2A:
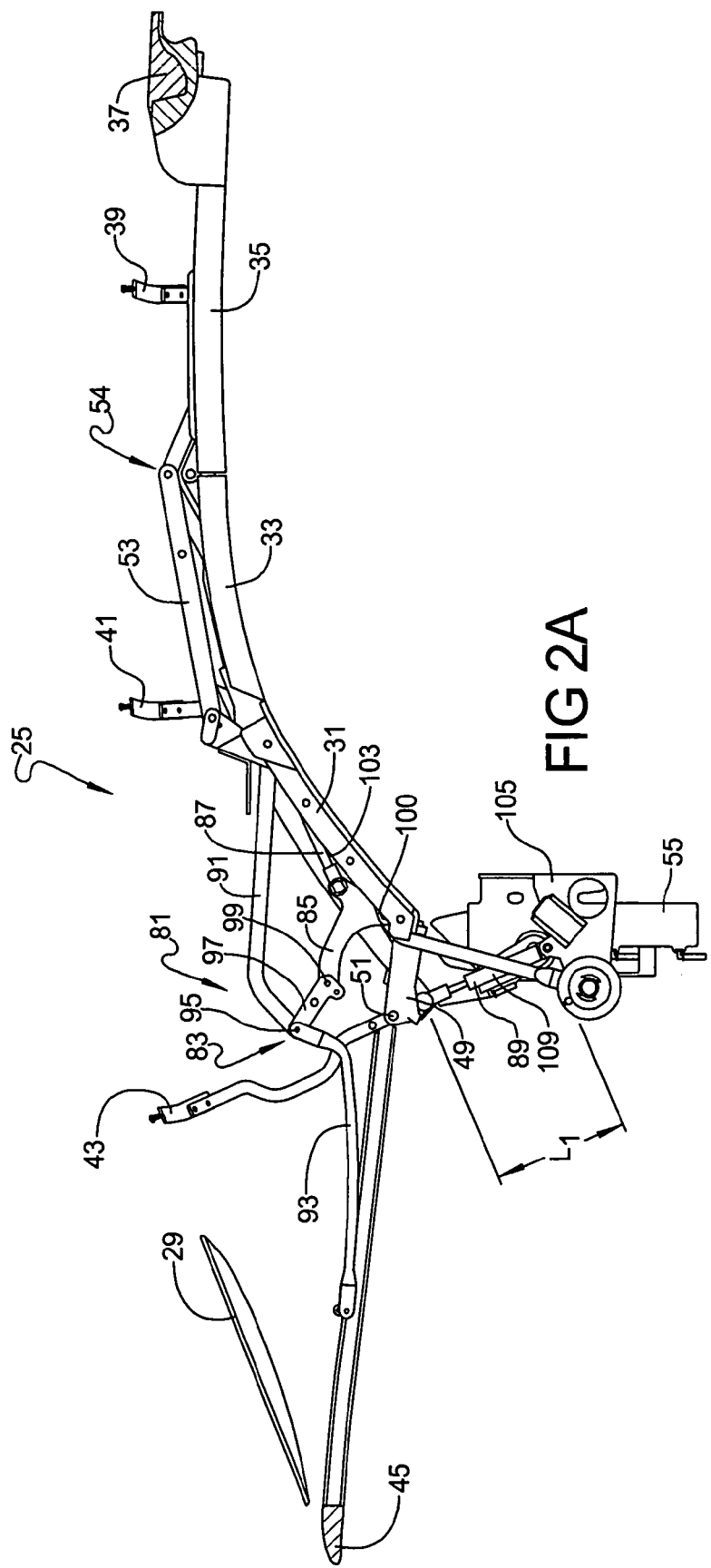
FIG. 2A is a side elevation view showing the preferred embodiment automotive vehicle convertible roof, in a fully raised position.

The following description of the preferred embodiment is merely exemplary in nature and is in no way intended to limit the invention, its application, or uses.

The preferred embodiment of a convertible roof 21 attached to an automotive vehicle body 23 of the present invention is shown in FIG. 1. Only one side of convertible roof 21 will be discussed herein since the other side is essentially a mirrored image of the one discussed and illustrated. Convertible roof 21 includes a top stack mechanism 25 which is covered by a pliable or flexible fabric cover 27 which has a solid glass back window or backlite 29, or alternately a flexible PVC window, attached thereto.

Referring to FIGS. 2A–5B, top stack mechanism 25 includes a rear side rail 31, a center side rail 33 and a front side rail 35. A forwardmost or number one roof bow 37 is attached to front side rail 35, a number two roof bow 39 is pivotally coupled to center side rail 33, a number three roof bow 41 is pivotally coupled to rear side rail 31 and a number four roof bow 43 is also pivotally coupled to rear side rail 31. A rearmost or number five roof bow 45 is pivotally coupled at a pivot 51 to a double clevis portion 49 of rear side rail 31. Alternatively, number five roof bow 45 can include a mounting bracket (not shown) affixed thereto, thereby forming an assembly, which is pivotally coupled to double clevis portion 49 at pivot 51. Top stack mechanism 25 also includes various additional links and linkage assemblies 53 and 54, and a primary top stack actuator 55, such as a hydraulic cylinder or alternately, an electric motor or rotary actuator. Primary actuator 55 moves convertible roof 21 between a fully raised and closed position covering a passenger compartment of the vehicle, as shown in FIGS. 1 and 2A, through intermediate positions, such as that shown in FIG. 4A, to a fully retracted and open position within a roof storage compartment or boot well, as shown in FIG. 5A.

A five bow actuation assembly 81 includes a buggy link assembly 83, a bell crank 85, an automatic actuator 87, and an adjustable length link 89. Link 89 can take a variety of forms as described below. Preferably, link 89 is in the form of an actuator having a varying length and operable to be locked at a given length, as described below. Buggy link assembly 83 includes a front buggy link 91, a rear buggy link 93 pivotally coupled to front buggy link 91 at a pivot joint 95, and a driving, upper mini link 97. Driving link 97 has a first end pivotally coupled to bell crank 85 at pivot 99 and an opposite, second end pivotally coupled at joint 95. A forward end of front buggy link 91 is rotatably coupled to rear side rail 31 and a rearmost end of rear buggy link 93 is rotatably coupled to number five roof bow 45. Bell crank 85 has a generally V-shape and is further attached to a set of flanges of rear side rail 31 at pivot 100.

Actuator 87 includes a hydraulic fluid powered cylinder 101 within which is disposed a movable piston coupled to an elongated piston rod 103. A ball receptacle is affixed to an end of piston rod 103 for rotatable engagement journaled about a ball stud which is mounted to an arm of bell crank 85. The opposite end of cylinder 101 is rotatably mounted within a pair of flanges of rear side rail 31.

Figure 2B:
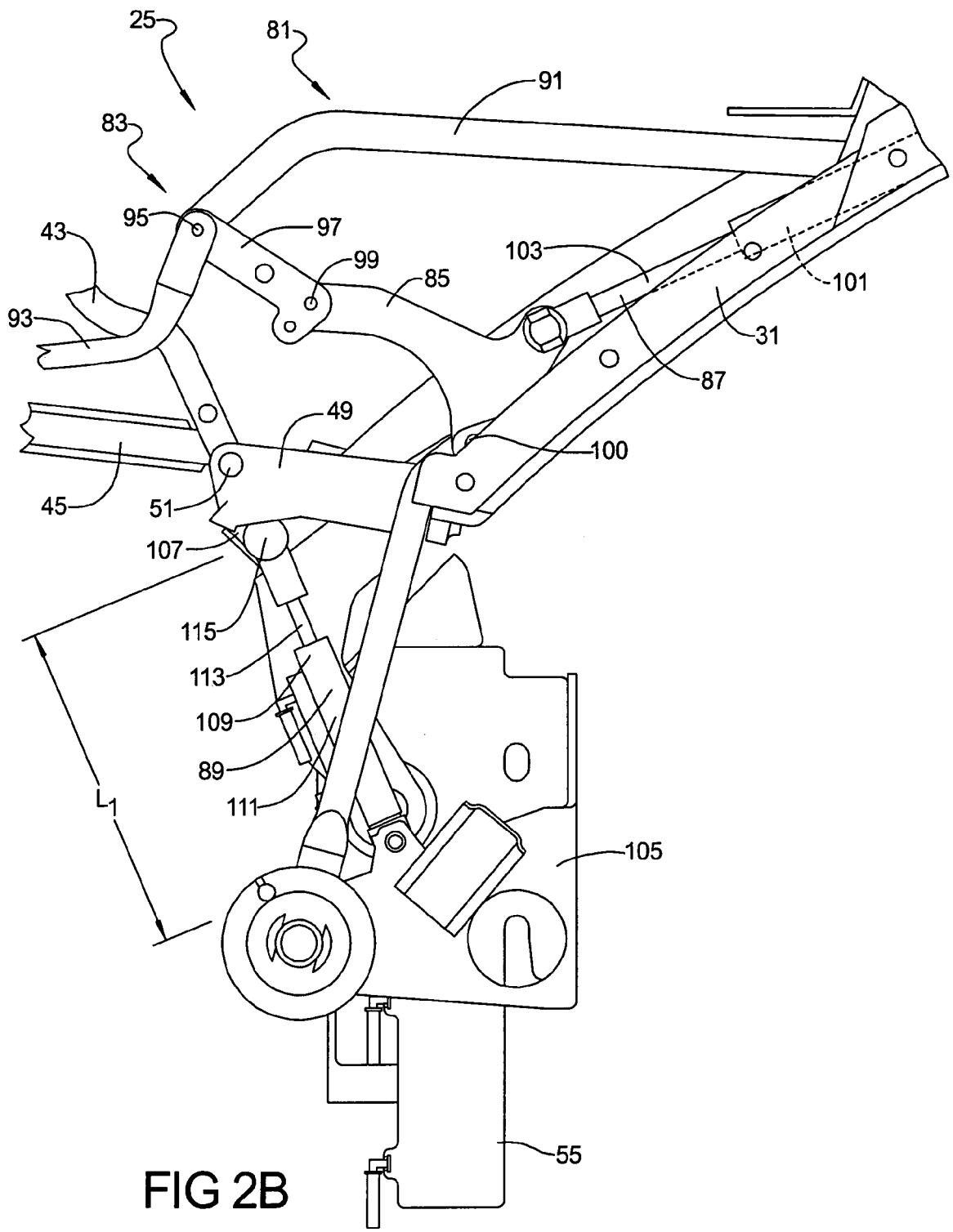
FIG. 2B is a fragmented side elevation view showing a portion of the automotive vehicle convertible roof of FIG. 2A.
Figure 3A:
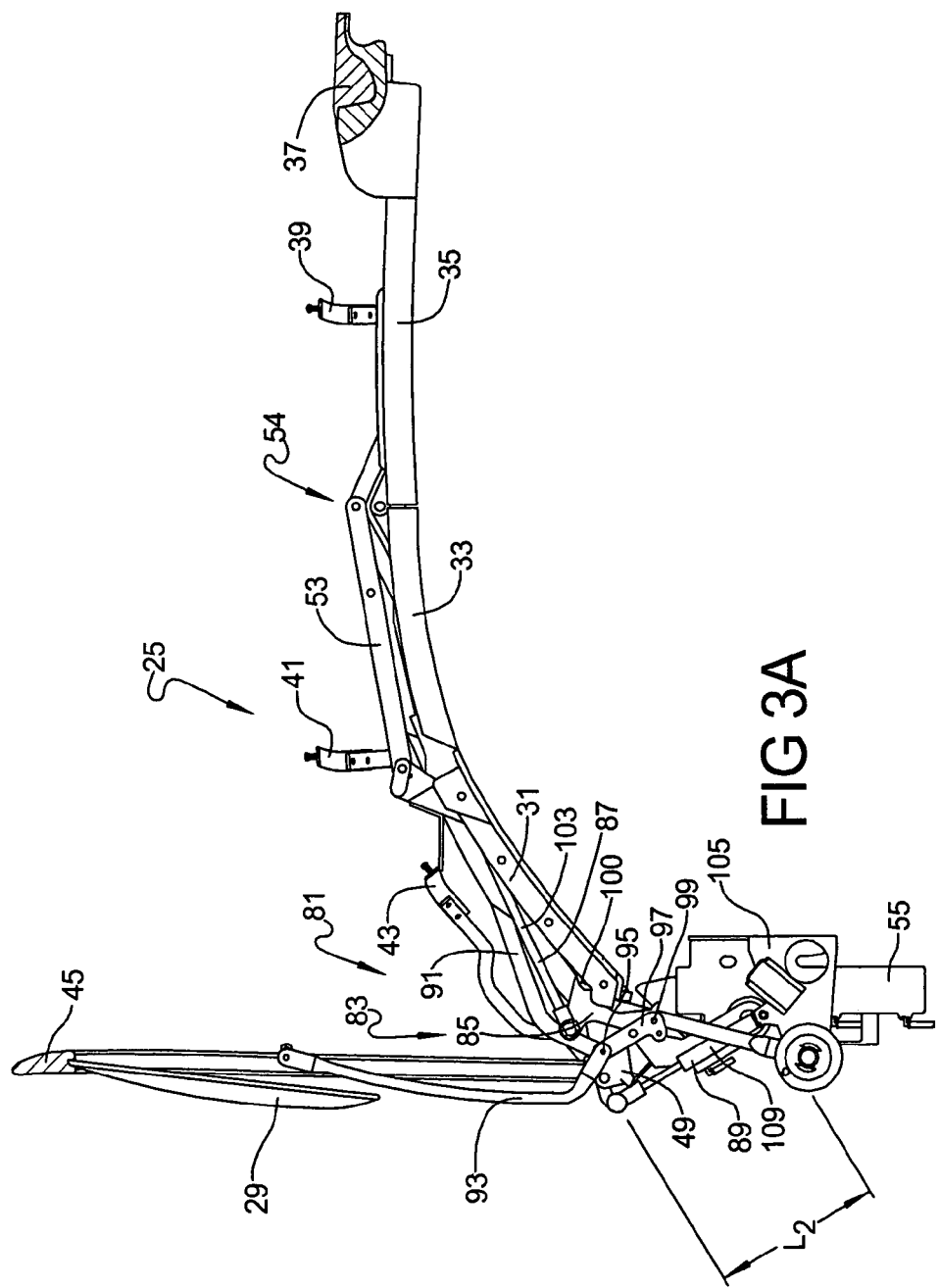
FIG. 3A is a side elevation view showing the preferred embodiment automotive vehicle convertible roof with the rearmost roof bow in the raised position.
Figure 3B:
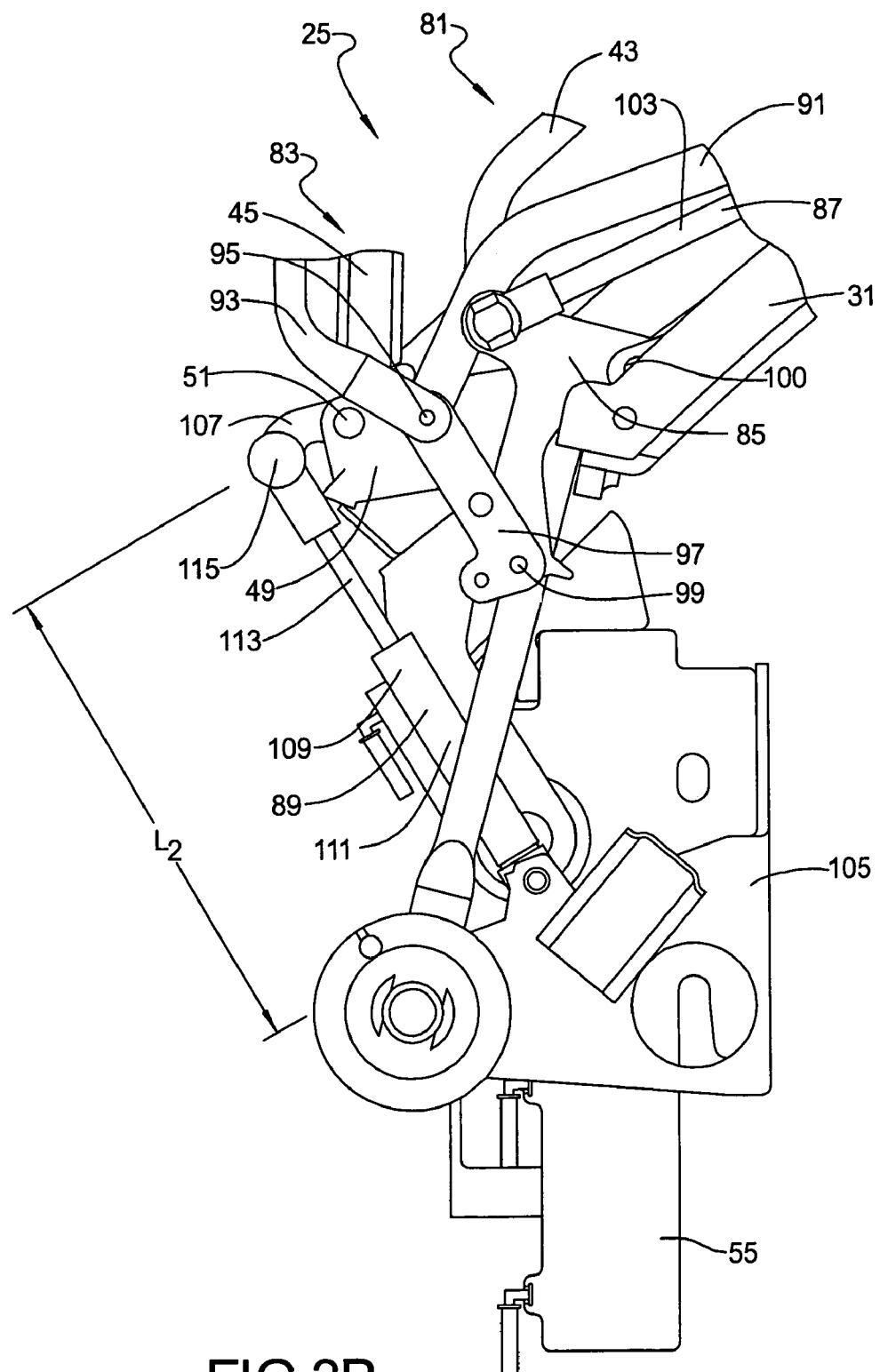
FIG. 3B is a fragmentary side elevation view of a portion of the automotive vehicle convertible roof of FIG. 3A.
Figure 4A:
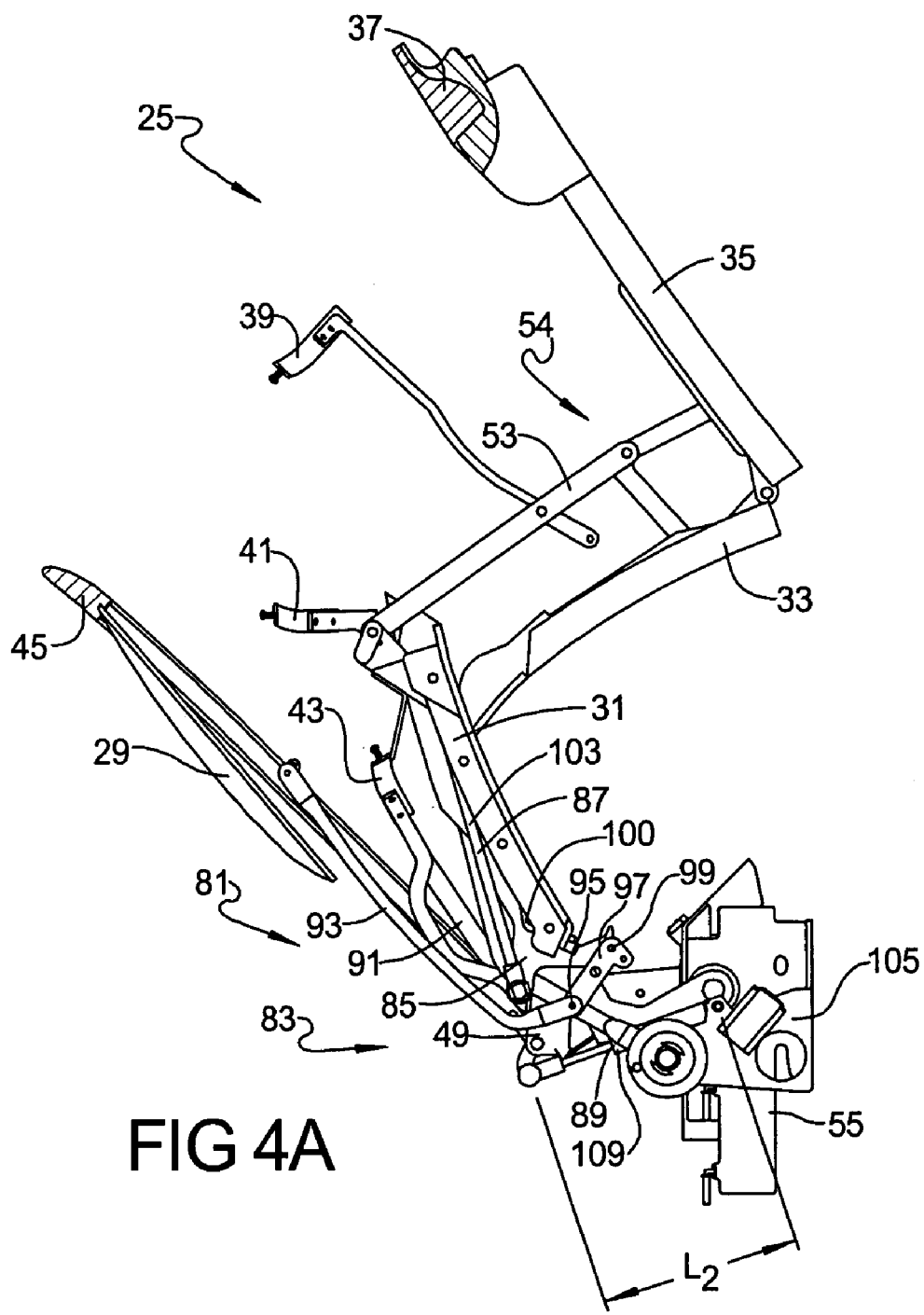
FIG. 4A is a side elevation view showing the preferred embodiment automotive vehicle convertible roof in a partially retracted position.
Figure 4B:
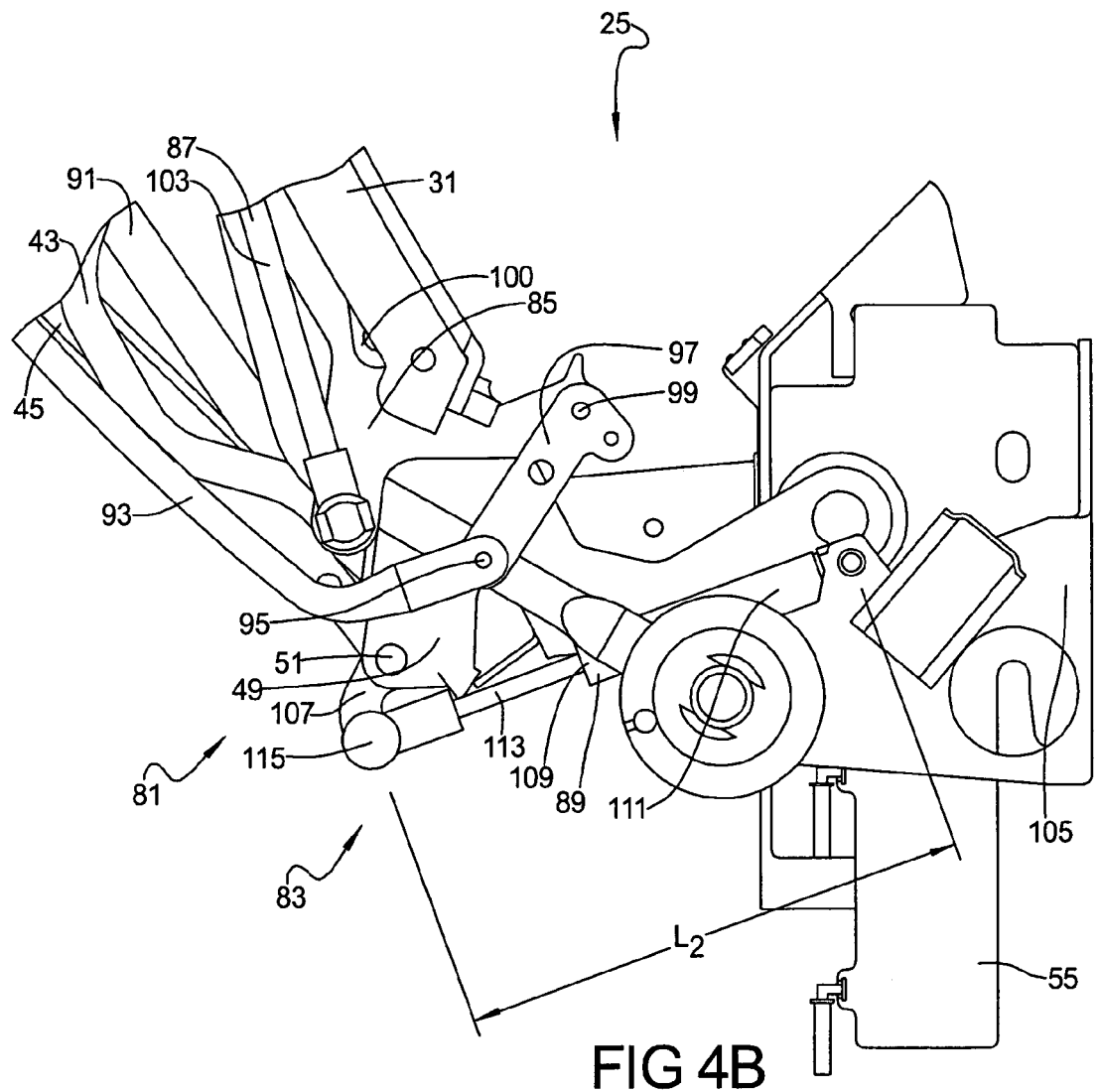
FIG. 4B is a fragmentary side elevation view of a portion of the automotive vehicle convertible roof of FIG. 4A.

One end of adjustable length link 89 is rotatably coupled to a bracket 105 that is fixedly attached to vehicle body 23. An opposite end of link 89 is rotatably coupled to a front offset portion 107 of number five roof bow 45. The length of link 89 will vary between a first length $L_1$ when number five roof bow 45 is in its nominal position, as shown in FIGS. 2A and 2B, to a second elongated length $L_2$ when number five roof bow 45 is in its raised position, as shown in FIGS. 3A and 3B. Link 89 maintains second length $L_2$ during retraction and extension of top stack mechanism 25, as shown in FIGS. 4A and B and 5A and B. Link 89 can take a variety of forms, as mentioned above. Preferably, link 89 is an actuator 109 that is adjustable between lengths $L_1$ and $L_2$ and lockable at length $L_2$. Furthermore, the actuator 109 can be passive between lengths $L_1$ and $L_2$ and lockable at length $L_2$ or actively driven between lengths $L_1$ and $L_2$ and locked at length $L_2$. For example, link 89/actuator 109 can include a hydraulic fluid-powered cylinder 111 within which is disposed a movable piston coupled to an elongated piston rod 113. A ball receptacle 115 is affixed to an end of piston rod 113 for rotatable engagement journaled about a ball stud which is mounted to offset portion 107 of number five roof bow 45. The opposite end of cylinder 111 is rotatably mounted to bracket 105.

Front and rear buggy links 91 and 93, respectively, are located in an over-center and extended orientation when the convertible roof is fully raised and the number five roof bow is in its nominal position essentially at a belt line 121 (FIG. 1) of the vehicle where it is positioned on top of an exterior surface of a movable and rigid tonneau cover 123. This orientation is best illustrated in FIGS. 1 and 2. Advancing of piston rod 103 relative to hydraulic cylinder 101 serves to rotate bell crank 85 toward number five roof bow 45 which, in turn, rotates and downwardly pulls driving link 97 in order to collapse buggy links 91 and 93 downward and away from their over-center condition and into an under-center position. Accordingly, this actuation motion automatically rotates number five roof bow 45 in an upward direction toward a generally vertical and raised position, as is shown in FIG. 3. Preferably, number five roof bow 45 is moved between 800–1000 relative to belt line 121. Even more preferably, number five roof bow 45 is moved to a raised position that is substantially vertical.

During the movement of number five roof bow 45 from the nominal position to the raised position, link 89/actuator 109 can be passive or active. Preferably, actuator 109 is active during this process and is driven from length $L_1$ to length $L_2$ simultaneously with the advancing of piston rod 103 relative to hydraulic cylinder 101. The driving of actuators 87, 109 is coordinated to provide a controlled movement of number five roof bow 45 from the nominal position to the raised position. Alternatively, when actuator 109 is passive, the movement of number five roof bow 45 from the nominal position to the raised position pulls on actuator 109 and causes actuator 109 to extend from length $L_1$ to length $L_2$. When actuator 109 is passively operating, hydraulic fluid is free to flow into and out of cylinder 111 as rod 113 is moved relative to cylinder 111. Regardless of actuator 109 being actively or passively driven, actuator 109 is locked or fixed at length $L_2$ for subsequent retraction of top stack mechanism 25, as described below. To lock actuator 109 at length $L_2$, the flow of hydraulic fluid into and out of cylinder 111 is prevented, such as by closing valves, so that rod 113 is fixed in position relative to cylinder 111. Actuator 109 remains fixed at length $L_2$ during subsequent movement of top stack mechanism 25 between the extended and retracted positions, as shown in FIGS. 3A and B, 4A and B, and 5A and B.

Simultaneously with or subsequently to the moving of number five roof bow 45 from the nominal position to the raised position, tonneau cover 123 (see FIG. 1) can be upwardly pivoted about a rear pivot axis, or alternately rearwardly slid above a trunk lid, to allow open access of the convertible roof for subsequent retraction and storage into the roof storage compartment. It is noteworthy that an elongated axis of actuator 87 is generally parallel to rear side rail 31 when the convertible top is fully raised and the number five bow is in its nominal position as shown in FIG. 2A. This allows for more compact and aesthetically pleasing packaging of components, due in part, to the reduced size of the cylinder. It is also noteworthy that number five roof bow 45 is substantially vertically oriented when in the raised position, as shown in FIG. 3A, as this position limits the intrusion of backlite 29 into the passenger compartment of the vehicle.

Figure 5A:
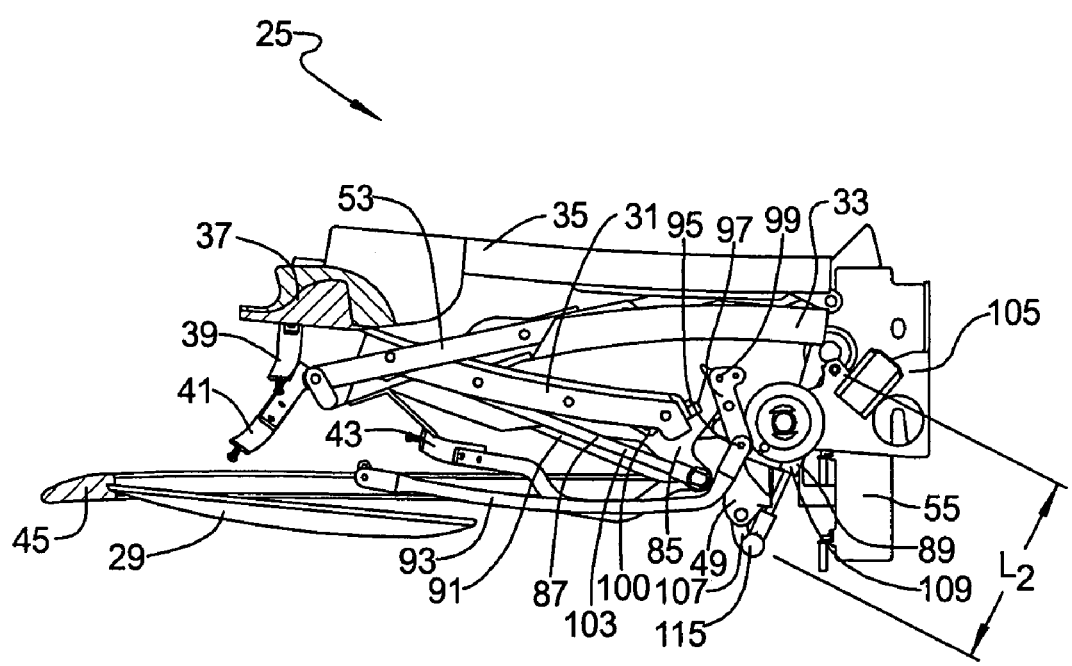
FIG. 5A is a side elevational view showing the preferred embodiment automotive vehicle convertible roof in a retracted position.
Figure 5B:
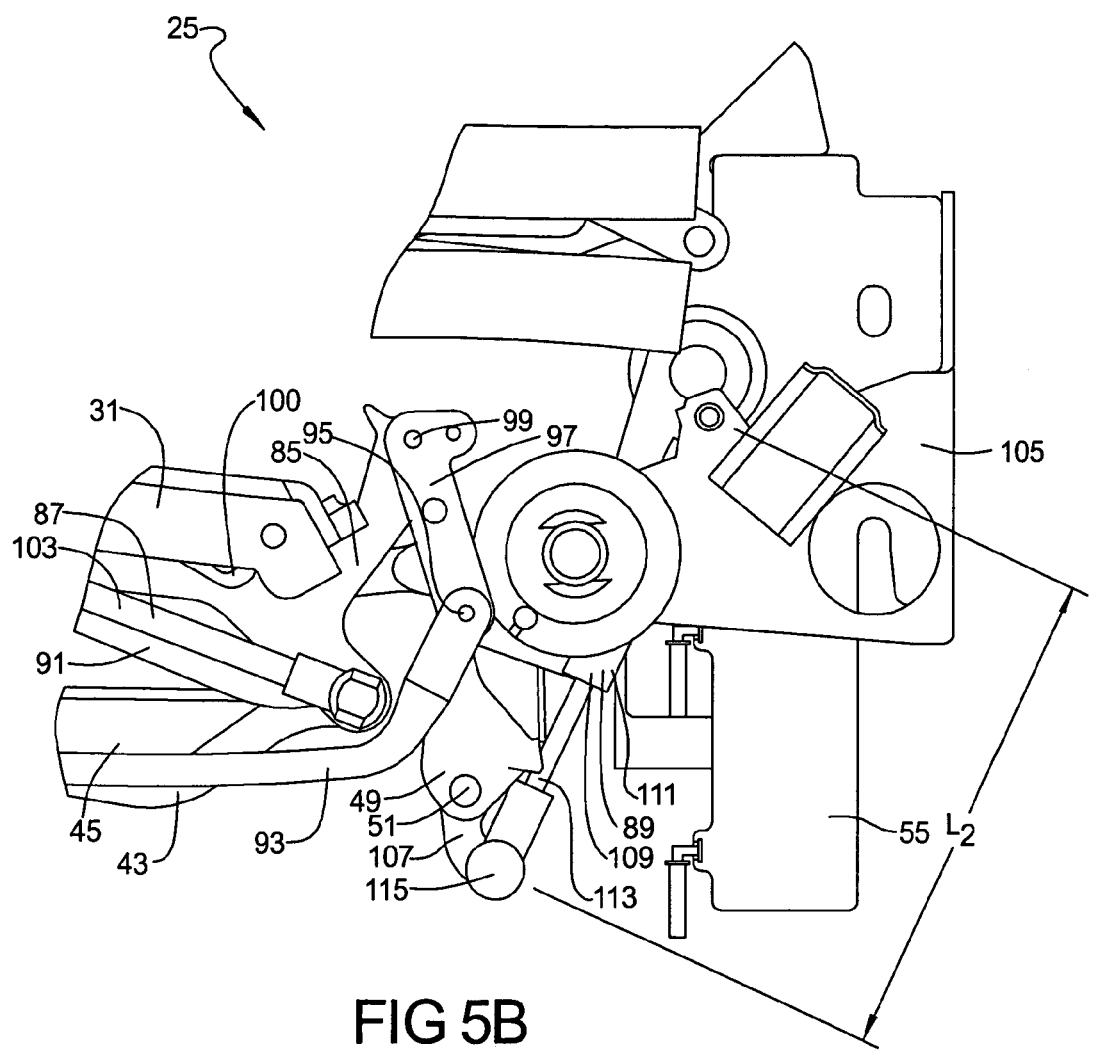
FIG. 5B is a fragmentary side elevation view of a portion of the automotive vehicle convertible roof of FIG. 5A.

Primary actuator 55 is operated to cause top stack mechanism 25 to move from the raised position, shown in FIG. 3A, through intermediate positions, such as that shown in FIG. 4A, to the fully retracted position, as shown in FIG. 5A. During this movement, link 89/actuator 109 remains fixed at length $L_2$ which causes number five roof bow 45 to approach rear side rail 31, thereby providing for compact storage of convertible roof 21 within the roof storage compartment. Additionally, the length of actuator 87 is passively changed as number five roof bow 45 approaches rear side rail 31.

Tonneau cover 123 can then be moved to its closed position to cover an entirety or a portion of top stack mechanism 25 within the roof storage compartment.

To move convertible roof 21 from the stowed position to the raised position, tonneau cover 123 is moved to an open position and primary actuator 55 is operated to cause top stack mechanism 25 to move to the raised position shown in FIG. 3A. Actuator 109 is released from being fixed at length $L_2$ and can be either actively or passively driven back to length $L_1$. When actively driven, actuators 87 and 109 operate in conjunction with one another to cause number five roof bow 45 to move from the raised position to the nominal position shown in FIGS. 2A and B. When passively driven, actuator 87 is operated to cause number five roof bow 45 to move from the raised position to the nominal position, which imparts a compressive force on actuator 109 and causes rod 113 to retract into cylinder 111. Front and rear buggy links 91 and 93, respectively, move into an over-center and extended orientation thereby securing number five roof bow 45 in the nominal position. Tonneau cover 123 prior to or simultaneously with the movement of number five roof bow 45 from the raised position to the nominal position is moved from the open position to the closed position.

While the preferred embodiment of the convertible top stack mechanism has been disclosed, it should be appreciated that variations may be employed which fall within the scope of the present invention. For example, actuator 109 can take other forms. Actuator 109 can comprise a jack screw and drive nut having a length that varies based upon relative rotation between the jack screw and the drive nut. Another possible form of actuator 109 is a magneto-rheological damper wherein a magneto-rheological fluid is disposed within a cylinder within which is disposed a movable piston coupled to an elongated piston rod. The piston rod can move relative to the cylinder while allowing the fluid to flow through openings in the piston and can be locked in place by applying an electric field thereby causing the viscosity of the rheological fluid to increase and essentially fix the piston rod relative to the cylinder. Another possible actuator 109 is a gas strut that is biased to length $L_1$ and is lockable at length $L_2$. It should be appreciated that still other types of actuators operable between lengths $L_1$ and $L_2$ and capable of being locked at length $L_2$ can be employed. Additionally, a movable trunk lid can be used in place of the disclosed tonneau cover. Furthermore, the top stack mechanism may be covered in whole or in part by multiple, substantially rigid, hard-top panel members in place of or in addition to a pliable cover, although all of the disclosed advantages may not be fully achieved. Moreover, additional linkages of varying shapes and locations may be employed with the present invention, although all of the disclosed advantages may not be fully achieved. It is also envisioned that electromagnetic devices can be used in place of the disclosed hydraulic actuator. Furthermore, the rearmost roof bow can be a number four, number six or other roof bow members depending upon the specific vehicle characteristics. While certain materials and shapes have been disclosed, it should be appreciated that various other shapes and materials and shapes can be employed. It is intended by the following claims to cover these and any other departures from the disclosed embodiments which fall within the true spirit of this invention.

Thus, the description of the invention is merely exemplary in nature and variations that do not depart from the gist of the invention are intended to be within the scope of the invention. Such variations are not to be regarded as a departure from the spirit and scope of the invention.

What is claimed is:

1. An automotive vehicle convertible roof comprising:
   a roof member moveable from a nominal position to a raised position;
   a side roof rail moveable from a raised position to a retracted position;
   an actuator operable to move the roof member between the nominal and raised positions; and
   a link pivotally coupled to the roof member, the link having a length that varies between a first length and a second length, the length of the link changes from the first length to the second length as the roof member moves from the nominal position to the raised position, and the length of the link remains at the second length as the side roof rail moves from the raised position to the retracted position.

2. The convertible roof of claim 1, wherein the actuator is a first actuator and the link comprises a second actuator operable between the first and second lengths.

3. The convertible roof of claim 2, wherein said first actuator drives movement of the second actuator from the first length to the second length.

4. The convertible roof of claim 2, wherein the first and second actuators are powered during movement of the roof member from the nominal position to the raised position.

5. The convertible roof of claim 2, wherein the first and second actuators include respective first and second hydraulic cylinders.

6. The convertible roof of claim 2, further comprising a third actuator operable to move the side roof rail between the raised and retracted positions.

7. The convertible roof of claim 1, further comprising a linkage assembly coupling the roof member to the side roof rail and wherein the actuator is coupled to the linkage assembly.

8. The convertible roof of claim 7, wherein the linkage assembly comprises a crank and the actuator is coupled to the crank.

9. The convertible roof of claim 7, wherein the linkage assembly is in an over-center position when the roof member is in the nominal position and in an under-center position when the roof member is in the raised position and the actuator drives the linkage assembly between the over-center and under-center positions as the actuator moves the roof member between the nominal and raised positions.

10. The convertible roof of claim 1, wherein the length of the link remains at the second length during movement of the side roof rail between the raised and stowed positions.

11. The convertible roof of claim 1, wherein one end of the link is pivotally coupled to the roof member and an opposite end of the link is pivotally coupled to a stationary location.

12. The convertible roof of claim 1, wherein the side roof rail is a rear side roof rail and the roof member is a number five bow assembly, and the number five bow assembly is directly pivotally connected to the rear side roof rail.

13. The convertible roof of claim 1, wherein the roof member is moved between the nominal and raised positions even when the side roof rail is substantially stationary.

14. The convertible roof of claim 1, further comprising a pliable roof cover attached to the roof member and wherein the roof member is a rearmost roof member and the side roof rail is a rear side roof rail which is pivotally coupled to the rearmost roof member.

15. The convertible roof of claim 1, wherein the actuator includes a hydraulic cylinder.

16. The convertible roof of claim 1, wherein the link comprises a fluid powered cylinder and a piston rod extendable from the cylinder.

17. The convertible roof of claim 1, wherein the roof member is a rearmost roof member.

18. A convertible roof system comprising:
   (a) a top stack mechanism moveable from a raised position to a retracted position, the top stack mechanism further comprising:
      (i) a number five roof bow; and
      (ii) a rear side rail;
   (b) an automatic actuator having a first end coupled to and moveable with the top stack mechanism, the automatic actuator operable to move the number five roof bow relative to the rear side rail; and
   (c) an adjustable length link pivotally coupled to the number five roof bow, the link having a length that varies between a first length and a second length, the length of the link changing between the first length and the second length as the number five roof bow moves relative to the rear rail, and the link remaining at the second length during movement of the rear side rail.

19. The convertible roof system of claim 18, wherein the automatic actuator is a first actuator and the link comprises a second actuator operable between the first and second lengths.

20. The convertible roof system of claim 19, further comprising a third actuator operable to move the top stack mechanism between the raised and retracted positions.

21. The convertible roof system of claim 18, further comprising a tonneau cover automatically moveable from an open position to a closed position when a rearmost section of the number five roof bow is automatically moved closer to the rear side rail.

22. The convertible roof system of claim 18, further comprising:
   a front buggy link, a rear buggy link, a crank, and a driving link;
   one end of the front buggy link coupled to the rear side rail;
   one end of the rear buggy link coupled to the number five roof bow;
   second ends of the front and rear buggy links coupled together;
   the driving link coupled to at least one of the buggy links; and
   the crank coupled to the driving link and coupled to a second end of the automatic actuator.

23. The convertible roof system of claim 18, wherein one end of the link is pivotally coupled to the number five roof bow and an opposite end of the link is pivotally coupled to a stationary location.

24. The convertible roof system of claim 18, wherein the link comprises a fluid powered cylinder and a rod extendable from the cylinder.

25. The convertible roof system of claim 18, wherein the number five roof bow moves relative to the rear side rail while the rear side rail is substantially stationary.

26. A method of operating a convertible roof, the method comprising:
   (a) moving a rearmost roof member relative to a side roof rail from a nominal position to a raised position;
   (b) changing a length of a link coupled to the rearmost roof member from a first length to a second length as the rearmost roof member is moved from the nominal position to the raised position;
   (c) automatically moving the side roof rail from a raised position to a retracted position; and
   (d) maintaining the link at the second length during movement of the said roof rail from the raised position to the retracted position.

27. The method of claim 26, wherein the link is a fluid powered cylinder having an extendable rod and (d) comprises preventing fluid from flowing into and out of the cylinder during movement of the said roof rail from the raised position to the retracted position so that the rod remains substantially stationary relative to the cylinder.

28. The method of claim 27, wherein (b) comprises adjusting a volume of fluid in the cylinder as the rearmost roof member is moved from the nominal position to the raised position so that the rod moves relative to the cylinder.

29. The method of claim 26, wherein (d) comprises maintaining the link at the second length during movement of the said roof rail between the raised and retracted positions.

30. The method of claim 26, wherein the link comprises a first powered actuator having an adjustable length, a linkage assembly limits movement of the rearmost roof member relative to the side roof rail, and (a) comprises moving the linkage assembly from an over-center position to an under-center position with a second powered actuator.

31. The method of claim 26, wherein the link comprises a first powered actuator having an adjustable length and (a) comprises moving the rearmost roof member relative to the side roof rail from the nominal position to the raised position with the first powered actuator and with a second powered actuator.

32. The method of claim 26, wherein (a) comprises moving the rearmost roof member with a first powered actuator that has a variable length and further comprising allowing a length of the first actuator to change as the side roof rail is automatically moved from the raised position to the retracted position.

33. The method of claim 26, further comprising moving the rearmost roof member closer to the side roof rail as the side roof rail is moving from the raised position to the retracted position.

34. The method of claim 26, wherein the rearmost roof member is a rearmost roof bow and further comprising automatically moving a tonneau cover from a closed position to an open position when the rearmost roof member is moved relative to a side roof rail from the nominal position to the raised position.

35. The method of claim 26, wherein (a) comprises moving the rearmost roof member with a first powered actuator and (c) comprises automatically moving the side rail with a second powered actuator.

* * * * *

UNITED STATES PATENT AND TRADEMARK OFFICE
CERTIFICATE OF CORRECTION

| | | |
|---|---|---|
| PATENT NO. | : 7,100,962 B2 | Page 1 of 1 |
| APPLICATION NO. | : 11/032868 | |
| DATED | : September 5, 2006 | |
| INVENTOR(S) | : Todd Schartner and Scott Duley | |

It is certified that error appears in the above-identified patent and that said Letters Patent is hereby corrected as shown below:

Column 3, line 54 "$L_{1 \text{ and } L2}$" should be --$L_1$ and $L_2$--.

Column 4, line 13, "800-1000" should be --80° - 100°--.

Signed and Sealed this

Twenty-sixth Day of June, 2007

JON W. DUDAS
*Director of the United States Patent and Trademark Office*